United States Patent [19]

Schwäbe et al.

[11] 3,994,378
[45] Nov. 30, 1976

[54] FRICTION-TYPE MULTI-DISK ENGAGING DEVICE

[75] Inventors: Jürgen Schwäbe, Korschenbroich, Germany; Jean Delplanque, St. Dizier, France

[73] Assignee: International Harvester Company, Chicago

[22] Filed: Nov. 5, 1975

[21] Appl. No.: 629,177

[52] U.S. Cl. .......................... 192/70.28; 188/71.5; 188/72.3; 188/72.4; 192/85 AA
[51] Int. Cl.² ................. F16D 13/69; F16D 55/10; F16D 65/22
[58] Field of Search ............... 188/71.5, 72.3, 72.4, 188/72.5, 216; 192/70.28, 85

[56] References Cited
UNITED STATES PATENTS

| 3,171,522 | 3/1965 | Petrie et al. | 188/216 X |
| 3,335,836 | 8/1967 | Swanson | 192/85 R |
| 3,403,754 | 10/1968 | Barrett et al. | 188/71.5 |
| 3,486,588 | 12/1969 | Grego | 188/216 X |
| 3,584,720 | 6/1971 | Bark et al. | 192/70.28 |
| 3,863,038 | 1/1975 | Kreitner et al. | 188/72.3 X |

FOREIGN PATENTS OR APPLICATIONS

| 614,913 | 12/1948 | United Kingdom | 192/70.28 |

Primary Examiner—Trygve M. Blix
Assistant Examiner—Douglas C. Butler
Attorney, Agent, or Firm—Raymond E. Parks; Floyd B. Harman

[57] ABSTRACT

In a disk brake assembly having a plurality of rotor disks affixed to a rotatable shaft, a stator disk carried by a stationary housing and journalled on the shaft, and a pressure plate movable under the influence of a hydraulically actuated piston to axially move the disks into frictional engagement with the housing; there is provided a resilient member on the stator disk for separating the disks upon release of the hydraulic pressure, and for retracting the pressure plate and piston.

3 Claims, 7 Drawing Figures

FRICTION-TYPE MULTI-DISK ENGAGING DEVICE

BACKGROUND OF THE INVENTION

The present invention relates to friction-type of multi-disk brakes for vehicles generally, and more particularly, to disk-pack brakes which move parallel to the axis of rotation of a power shaft.

FIELD OF THE INVENTION

This invention relates to a friction-type multi-disk engaging device comprising stator and rotor disks which are arranged in a housing. The stator or intermediate disk is sandwiched between two rotor disks and the rotor disks together with the intermediate disk can be moved axially along a shaft by means of a hydraulically actuated piston and pressure plate towards a supporting flange or wall provided in a chamber of the housing. A resilient means is provided on the stator disk for returning the piston and pressure plate and separating the disks.

In a multi-disk engaging device, such as a multi-disk clutch or a multi-disk friction brake, it is essential to be able to disengage the pressure plate and the disks and to retract the piston quickly following the release of the actuating force on the piston so that no residual force remains. On clutches this residual force effects a transfer of driving force even though the actuating force has ceased. Whereas on brakes, this residual force produces an undesired braking effect which prevents the vehicle from coasting after the brakes are released.

In addition, the pressure plate which is forced against the disks to frictionally engage them is often actuated by a fluid pressure, which pressure cannot supply a retracting force, and hence, due to frictional resistance between the movable elements of the brake, and also due to the presence of a small residual or precharge pressure, the plate is never fully retracted to providing a running clearance between the disks. This causes the disks to drag or rub, resulting in overheating and excessive wear even when the brake is not being applied.

DESCRIPTION OF THE PRIOR ART

In the U.S. Pat. No. 3,286,795—Barrett et al— Nov. 22, 1966, a spring and a deformable honeycombed member are used between the wall of the brake housing and the pressure plate to retract the piston upon the release of hydraulic pressure in the piston cylinder. U.S. Pat. Nos. 3,403,754 and 3,403,755 —Barrett et al— Oct. 1, 1968 substitute a bellows and an elastically deformable tube and pin arrangement for the honeycomb member and spring. In U.S. Pat. No. 3,532,190 —Palmer— Oct. 6, 1970 a spring loaded piston and cylinder unit is used between the wall and pressure plate for retracting the piston.

Another known piston retracting device is shown in U.S. Pat. No. 2,743,790 —Bricker— May 1, 1956. The piston retracting or returning member generally consists of a spring acting at one end upon the piston and at the other end on a fixed or wall section of the engaging device. With this type of piston returning or restoring device one cannot rule out the sticking together of the rotor disks against the pressure plate and the wall of the device housing or their sticking to the intermediate disk in form of a complete package or unit. Also with the prior art design rather a high undesired residual force is transferred between the disks despite the restoring of the piston to its original position. Performance and horse power is wasted and lost in overcoming the residual force in start-stop operation cycles. Furthermore, in the known design, where the piston is returned by means of a spring, it entails high manufacturing and assembly expenditure since the spring must be assembled under load.

SUMMARY OF THE INVENTION

Therefore, this invention is based on the objective of providing a friction-type multi-disk engaging device, such as a brake or clutch, on which the residual force is largely reduced by simple means of design. According to the invention this problem is solved by providing several elastic expanding elements, which function as piston retracting devices, on the periphery of the intermediate or stator disk which abuts against both the pressure plate of the piston and the supporting flange or wall of the brake housing. By applying the resilient member means according to this invention it is guaranteed that on either side of the intermediate disk axially acting forces are generated by which, after the release of the hydraulic pressure acting on the piston, not only the piston is automatically returned, but simultaneously the center or intermediate disk is moved away from the rotor disc adjacent the supporting flange which acts as counter-pressure area, so that an optimum clearance is achieved for each individual disk. This method considerably reduces the residual force. In addition, the expanding elements arranged according to the invention can be assembled easily and their manufacture is straight forward and economical.

The expanding elements can be of any design, provided they are elastic and can exert the desired retracting or returning force on the pressure plate, piston and the intermediate disk. In an appropriate design the expanding elements are made of rubber, elastic plastics, spring steel or similar material. In these cases it is advisable to design the expanding elements in form of a double-Tee or a capital letter I. The expanding elements can be inserted in grooves provided on the periphery of the intermediate disk.

It is also possible to design the expanding elements in form of plate springs. In this case the plate springs extending on both lateral faces of the intermediate disk have wave-like bent leg sections. The plate springs can be riveted onto the intermediate disk or can be inserted by means of a center web in grooves provided on the periphery of the intermediate disk. It is advisable to design the plate springs in the shape of either an M, a C, S or a Z.

BRIEF DESCRIPTION OF THE DRAWING

Preferred embodiments according to the invention are shown in the figures of the drawing and are described in detail as follows.

DESCRIPTION OF THE PREFERRED EMBODIMENT

Figure 1:
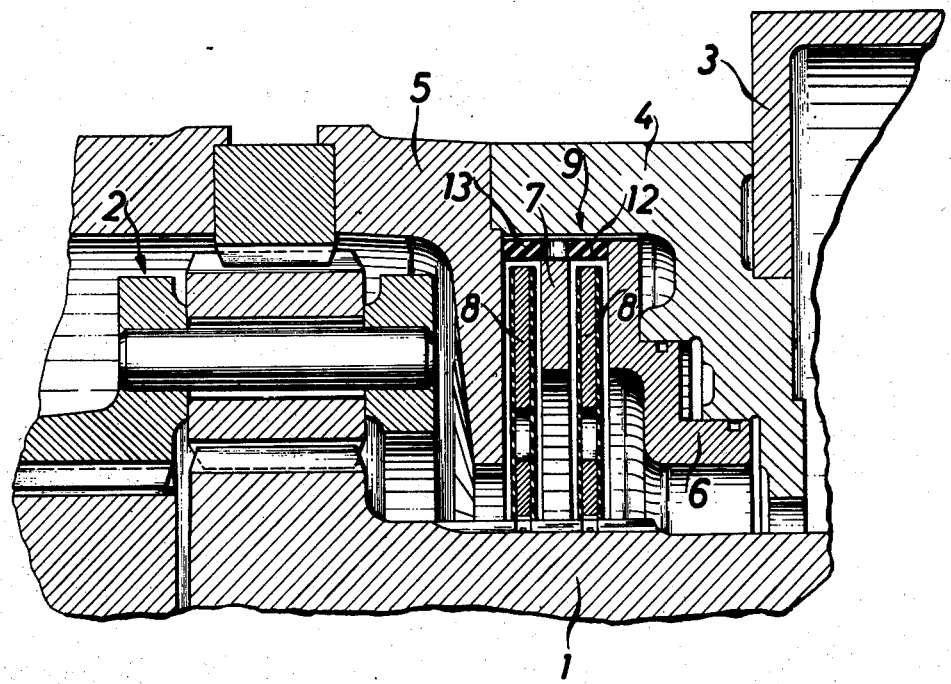
FIG. 1 shows a first embodiment of the device in partial cross-section.

The multi-disk engaging device shown in FIG. 1 has a drive shaft 1 by which a planetary drive 2 (partially shown in detail) can be driven. The drive shaft 1 is supported in a transmission housing 3 which also houses a flange housing 4 on which a supporting flange 5 is arranged. A piston 6, which is axially movable by pressure media is supported in the wall member of the flange housing 4. The piston 6 has a pressure plate incorporated thereon which is used to act upon a disk package of a friction brake. The disk package comprises for example an intermediate stator disk 7 journalled on the shaft 1 and anchored or supported in the flange housing 4 in an axially movable, but non-rotatable manner, and of the two rotor disks 8 arranged to either side of the intermediate disk 7. The inner peripheries of the rotor or brake disks 8 are splined or locked to the drive shaft 1 torsionally, but are free to move axially. The brake linings are fitted to the brake disks 8 in any known manner.

Figure 2:
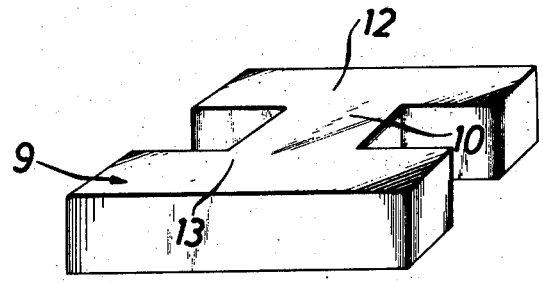
FIG. 2 shows a perspective representation of an expanding element according to the invention.
Figure 3:
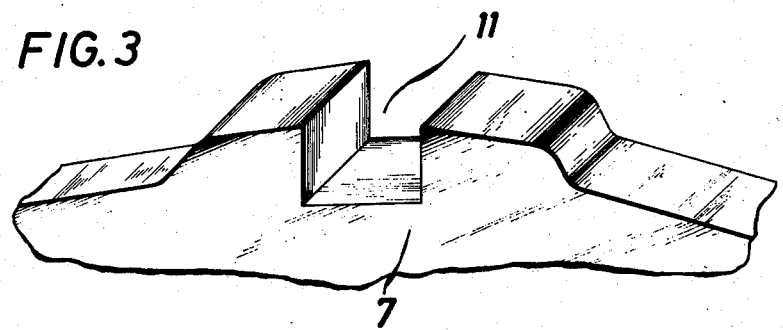
FIG. 3 shows part of an intermediate disk designed to receive the expanding element of FIG. 2.
Figure 4:
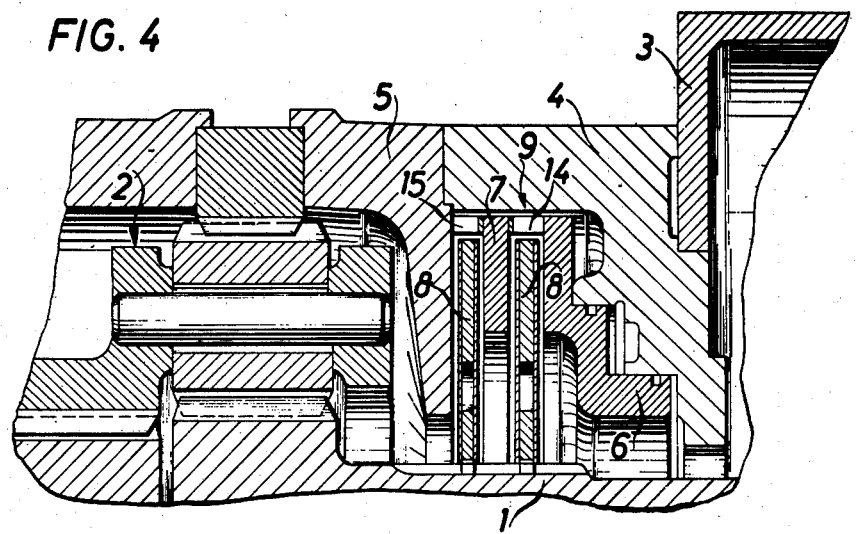
FIG. 4 shows a second embodiment of the device in partial cross-section.
Figure 5:
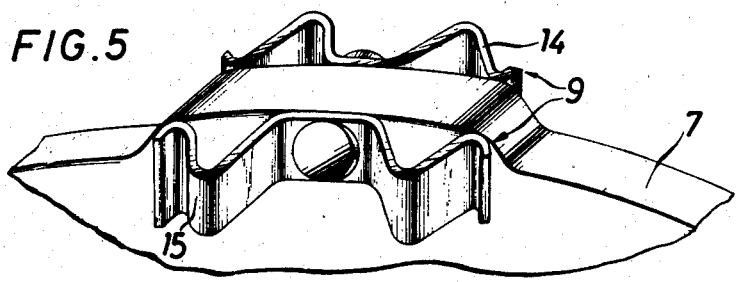
FIGS. 5, 6, and 7 each show various potential designs of an expanding element mounted on an intermediate disk.

Circumferentially spaced on the outer periphery of the intermediate disk and fitted onto the same are elastic expanding elements 9. In the embodiment shown in FIG. 1, these expanding elements 9 each comprise a double-Tee or capitol I shaped rubber element which is shown in enlarged detail in FIG. 2. By means of a web 10 these expanding elements are inserted in circumferentially spaced grooves 11 provided on the outer periphery of the intermediate disk 7 so that the leg sections 12, 13 of the expanding elements protrude or extend from either side of the intermediate disk.

To actuate the multi-disk brake, the pressure medium acts upon the piston 6 so that it is extended or moved to the left as viewed in FIG. 1. By that, the brake disks 8 and the intermediate disk 7 are axially moved to the left towards the wall member of the fixed supporting flange 5, and consequently the braking is effected. Simultaneously with the axial movement of the disks the projecting legs 12, 13 of the elements 9 are compressed between the wall member of the flange 5 and the pressure plate on the piston 6.

After releasing the pressure media acting on the piston 6, it is returned or retracted to the right to its original position by the elasticity of the expanding legs 12, 13 of the resilient elements 9. First of all the leg sections 12 push the pressure plate of the piston to the right up to the wall member of the flange 4 and simultaneously, the intermediate disk 7 is moved to the right by the leg sections 13 abutting against the wall member of the supporting flange 5. By this double adjustment of both the piston 6 and the intermediate disk 7, a clearance is obtained between the individual brake disks 8 and the intermediate disk 7 as well as the wall of the supporting flange 5 and the piston 6, so that the normally occurring residual force is largely reduced. It is to be noted that the wall member of flanges 4 and 5 are parallel and form a chamber therebetween for the disk pack.

DESCRIPTION OF ALTERNATE EMBODIMENTS

In the device pictured in the FIGS. 4 through 7, the expanding elements 9 are made up of plate springs or spring steel which operate by following the same principle. With the design pictured in FIG. 5 the plate spring 9 consists of leg sections 14, 15, riveted to either side of the intermediate disk 7. The leg sections are shaped in the form of an M.

Figure 6:
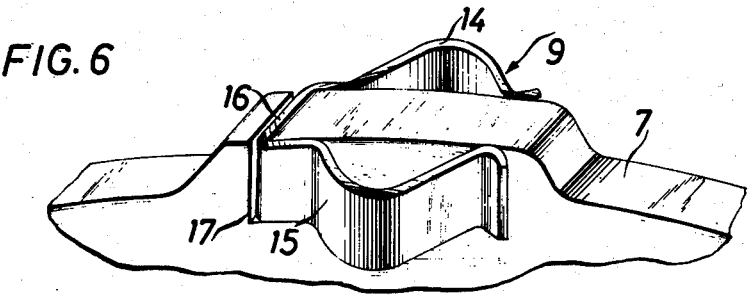
Figure 7:
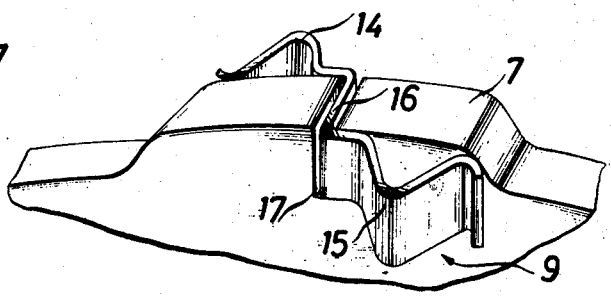

The design according to FIG. 6 shows the plate spring 9 having a connecting web 16 which is inserted in a groove 17 provided on the intermediate disk 7. On either side of the web 16 there are leg sections 14, 15. The leg sections 14 and 15 together with the web 16 form the shape of a C.

The design according to FIG. 7 again shows the plate spring 9 having a connecting web 16 inserted in a groove 17 provided on the intermediate disk 7. On either side of the intermediate disk 7 the web 16 continues in form of wave-like leg sections 14, 15. In this case the web 16 together with the leg sections 14, 15 forms an S or a Z.

On the intermediate disk 7 the expanding elements 9 are all arranged guided at the inner periphery of the flange housing 4, so that they are kept in position and thus cannot interfere with the brake disks 8.

This invention is not limited to the embodiment shown, but permits modifications within the scope of the claims. Therefore, it is possible to provide more than one stator disk and the required number of additional brake or rotor disks. In addition, the shape of the expanding elements may differ from the embodiments shown, provided they are elastic and their elastic ends rest against the piston at the one side and the supporting flange at the other side. It is not absolutely essential to have expanding elements which are elastic on the whole. Important is the fact that part of the expanding element is designed elastic. The section required for fastening the expanding elements may well be of an inelastic design.

The embodiments of the invention in which an exclusive property of priviledge is claimed are defined as follows:

1. In a friction-type multi-disk engaging device having a housing, the housing having a chamber and including two parallel spaced apart wall members, a shaft rotatably carried in the chamber and passing through the wall members, a stator disk anchored to the housing between the wall members and journally mounted for axial shifting relative to the shaft, a pair of rotor disks sandwiching the stator disk therebetween and being splined to the shaft for axial shifting relative to the shaft, a piston carried in one wall member and having a pressure plate thereon adjacent one rotor disk including a pressure medium means for expanding the piston outward from the one wall member and pressing the pressure plate against the one rotor disk and axially shifting the stator and rotor disks against the second wall member, and retracting means connected to the stator disk for retracting the piston upon release of the pressure medium means and for axially shifting the stator and rotor disks and the pressure plate in the opposite direction, wherein the retracting means comprise a plurality of resilient members circumferentially spaced along the stator disk, each of the resilient members having a pair of compressible legs projecting axially from the sides of the stator disk respectively towards the pressure plate and the second wall member, wherein each resilient member is made of spring steel and is formed in the shape of a capital M letter, each resilient member consisting of a pair of M's fixed at the middle of the M's to and on the opposite sides of the stator disk with the tips of the M's projecting outwardly therefrom.

2. In a friction-type multi-disk engaging device having a housing, the housing having a chamber and including two parallel spaced apart wall members, a shaft rotatably carried in the chamber and passing through the wall members, a stator disk anchored to the housing between the wall members and journally mounted for axial shifting relative to the shaft, a pair of rotor disks sandwiching the stator disk therebetween and being splined to the shaft for axial shifting relative to the shaft, a piston carried in one wall member and having a pressure plate thereon adjacent one rotor disk including a pressure medium means for expanding the piston outward from the one wall member and pressing the pressure plate against the one rotor disk and axially shifting the stator and rotor disks against the second wall member, and retracting means connected to the stator disk for retracting the piston upon release of the pressure medium means and for axially shifting the stator and rotor disks and the pressure plate in the opposite direction, wherein the retracting means comprise a plurality of resilient members circumferentially spaced along the stator disk, each of the resilient members having a pair of compressible legs projecting axially from the sides of the stator disk respectively towards the pressure plate and the second wall member, wherein each resilient member is made of spring steel and is formed in the shape of a letter C and consists of a pair of C's having the curved backs projecting outwardly from the sides of the stator disk, one end tip of each C of the pair being connected to each other by a connecting bar; and the periphery of the stator disk having a plurality of circumferentially spaced slots corresponding in size and shape to the connecting bar of the C's with the connecting bar of each pair of C's respectively mounted therein.

3. In a friction-type multi-disk engaging device having a housing, the housing having a chamber and including two parallel spaced apart wall members, a shaft rotatably carried in the chamber and passing through the wall members, a stator disk anchored to the housing between the wall members and journally mounted for axial shifting relative to the shaft, a pair of rotor disks sandwiching the stator disk therebetween and being splined to the shaft for axial shifting relative to the shaft, a piston carried in one wall member and having a pressure plate thereon adjacent one rotor disk including a pressure medium means for expanding the the piston outward from the one wall member and pressing the pressure plate against the one rotor disk and axially shifting the stator and rotor disks against the second wall member, and retracting means connected to the stator disk for retracting the piston upon release of the pressure medium means and for axially shifting the stator and rotor disks and the pressure plate in the opposite direction, wherein the retracting means comprise a plurality of resilient members circumferentially spaced along the stator disk, each of the resilient members having a pair of compressible legs projecting axially from the sides of the stator disk respectively towards the pressure plate and the second wall member, wherein each resilient member is made of spring steel and is formed in the shape of a letter C and consists of a pair of C's having the curved backs projecting outwardly from the sides of the stator disk, one end tip of each C of the pair being connected to each other by a connecting bar; and the periphery of the stator disk having a plurality of circumferentially spaced slots corresponding in size and shape to the connecting bar of the C's with the connecting bar of each pair of C's respectively mounted therein and, wherein the connecting bar connects the alternate facing one end tip of each C of the pair forming the letter S.

* * * * *